United States Patent
Chauvin et al.

(10) Patent No.: US 11,625,108 B2
(45) Date of Patent: Apr. 11, 2023

(54) WORKING RANGE AND LIFT DETECTION IN AN INPUT DEVICE

(71) Applicant: Logitech Europe S.A., Lausanne (CH)

(72) Inventors: Nicolas Chauvin, Chexbres (CH); Francois Morier, Romanel-sur-Lausanne (CH); Francois Scholder, Rolle (CH); Florian Jeannerat, Morges (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/038,778

(22) Filed: Sep. 30, 2020

(65) Prior Publication Data

US 2022/0100288 A1  Mar. 31, 2022

(51) Int. Cl.
| | |
|---|---|
| *G06F 3/0354* | (2013.01) |
| *G06F 3/03* | (2006.01) |
| *G06F 3/042* | (2006.01) |
| *G06F 3/033* | (2013.01) |

(52) U.S. Cl.
CPC ........ *G06F 3/03543* (2013.01); *G06F 3/0304* (2013.01); *G06F 3/0421* (2013.01); *G06F 3/033* (2013.01); *G06F 3/0354* (2013.01); *G06F 3/03544* (2013.01)

(58) Field of Classification Search
CPC .. G06F 3/03543; G06F 3/0421; G06F 3/0304; G06F 3/033; G06F 3/0354; G06F 3/03544; G06F 3/0317; G06F 3/0346; G06F 3/0383
See application file for complete search history.

(56) References Cited

U.S. PATENT DOCUMENTS

| | | | | |
|---|---|---|---|---|
| 2005/0057492 A1* | 3/2005 | Bathiche | ................. | G06F 3/038 345/156 |
| 2007/0109267 A1* | 5/2007 | Guo | ..................... | G06F 3/0317 345/166 |
| 2008/0158158 A1* | 7/2008 | Cheah | ................... | G06F 3/0317 345/166 |
| 2008/0252602 A1* | 10/2008 | Kakarala | ............... | G06F 3/0317 345/166 |
| 2009/0135140 A1 | 5/2009 | Constantin et al. | | |
| 2010/0305418 A1* | 12/2010 | Deliwala | ................. | G01S 17/06 600/324 |

(Continued)

*Primary Examiner* — Patrick N Edouard
*Assistant Examiner* — Joseph P Fox
(74) *Attorney, Agent, or Firm* — Kilpatrick Townsend & Stockton LLP

(57) ABSTRACT

A method of operating an input device can include generating a light beam by a light source module, steering the light beam towards a target location on an underlying surface, steering a reflected light beam towards an image sensor of the input device, receiving the reflected light beam by the image sensor, and generating tracking data by the image sensor that corresponds to a two-dimensional (2D) movement of the input device on the underlying surface. The method further includes determining that the input device is operating: on and in contact with the underlying surface when the reflected light beam received by the image sensor is located on a first set of pixels of the image sensor, and above and not in contact with the underlying surface when the reflected light beam is located on a second set of pixels of the plurality of pixels of the image sensor.

20 Claims, 9 Drawing Sheets

(56) References Cited

U.S. PATENT DOCUMENTS

| | | | | |
|---|---|---|---|---|
| 2011/0141021 A1* | 6/2011 | Raynor | ................ | G06F 3/0317 |
| | | | | 345/166 |
| 2019/0171302 A1* | 6/2019 | Su | ....................... | G06F 3/03543 |
| 2021/0141465 A1* | 5/2021 | Pang | ...................... | G01B 11/00 |

* cited by examiner

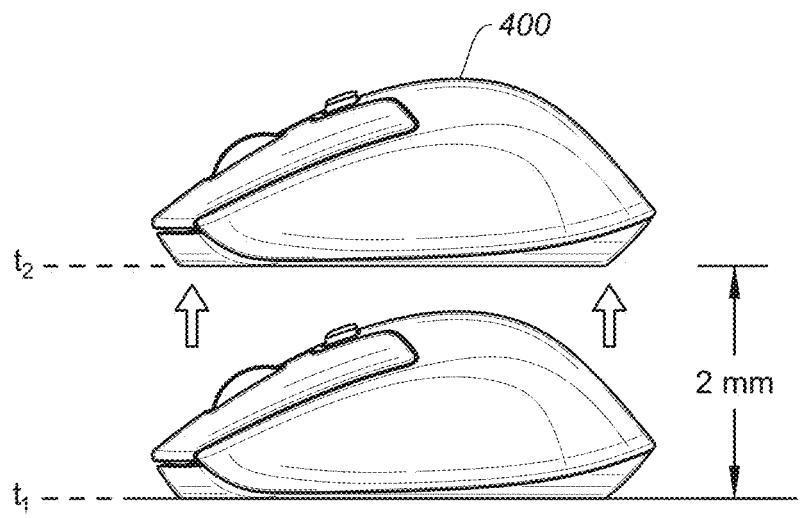
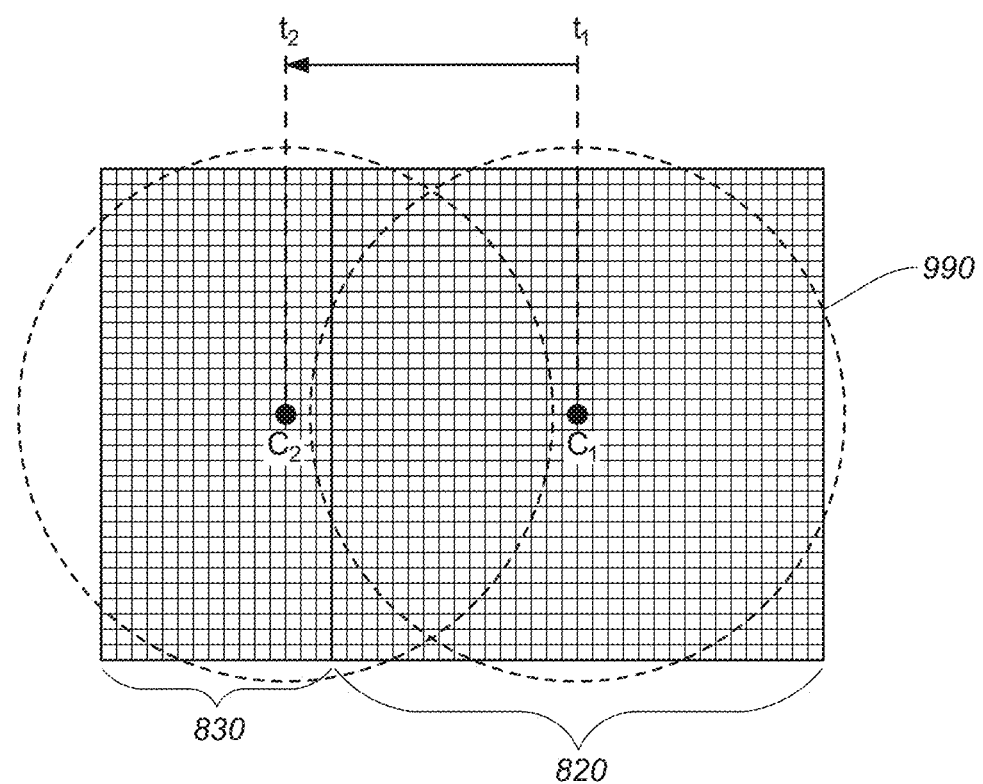
FIG. 9

WORKING RANGE AND LIFT DETECTION IN AN INPUT DEVICE

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktops, laptops, tablets and "phablet" computers, smart phones, personal digital assistants, wearable devices (e.g., smart watches, glasses), virtual reality (VR) and/or augmented reality (AR) systems, and the like.

Computer mice, in particular, have undergone significant improvements in functionality, accuracy, ergonomics, and versatility. Earlier designs, including the "mechanical mouse," used a rubber ball coupled to two freely rotating rollers situated 90 degrees from one another to roll along an underlying surface. The first roller detects forward-backward motion of the mouse and the second roller detects left-right motion, with each roller sharing the same shaft as a corresponding encoder wheel with slotted edges that interrupt infra-red light beams generate electrical pulses that can be translated to wheel movement, Mechanical mice were notorious for picking up dirt, unpredictable tracking, and needing frequent disassembly and cleaning.

Contemporary mice may include optical mice using opto-electronic sensors to compare successive images of an underlying surface on which the computer mouse operates to interpret movement. Technological improvements have allowed optical mice to functionally track over varied types of surfaces (e.g., table tops, paper, glass, etc.), while avoiding some of the problems associated with mechanical mice. Optical mice typically employ light-emitting diodes (LEDs) and/or laser (e.g. coherent) light and an imaging array of photodiodes to detect movement relative to the underlying surface, which has proven to be much more reliant and robust as compared to their mechanical counterparts. Multi-surface use allows usage over a wider range of applications, which can be desirable by the average consumer. Despite these advantages, more improvements are needed for the more discerning consumers.

It should be noted that unless otherwise indicated herein, the materials described in this section are not prior art to the claims in this application and are not admitted to be prior art by inclusion in this section.

BRIEF SUMMARY

In certain embodiments, an input device comprises a housing; one or more processors; a light source module coupled to the housing and controlled by the one or more processors, the light source module configured to generate and direct light towards an underlying surface that the input device is operating on; and an image sensor module coupled to the housing and controlled by the one or more processors. The image sensor module can include an image sensor configured to receive reflected light from the light source module that is reflected off of the underlying surface, and generate tracking data that corresponds to a two-dimensional (2D) movement of the input device with respect to an underlying surface based on the received reflected light from the light source module. The image sensor can be comprised of a plurality of pixels including a first set of pixels of the plurality of pixels configured to receive the reflected light from the light source module when the input device is operating on the underlying surface, and a second set of pixels of the plurality of pixels adjacent to the first set of pixels that is configured to extend a vertical movement detection range of the input device by receiving the reflected light from the light source module when the input device is lifted off of the underlying surface. In some implementations, the first set of pixels forms a square shape that receives the reflected light from the light source module when the input device is operating on the underlying surface, where the second set of pixels is adjacent to the first set of pixels such that the first set of pixels and the second set of pixels together form a rectangle, and wherein the second set of pixels is configured at a location relative to the first set of pixels such that the reflected light from the light source module moves from the first set of pixels to the second set of pixels as the input device is lifted off of the underlying surface. In some cases, the input device is configured to detect both 2D movement of the input device relative to the underlying surface and detect the input device being lifted off of the corresponding surface using a single image sensor module (e.g., system 500).

In further embodiments, reflected light from the light source module forms a spot on the first set of pixels when the input device is operating on the underlying surface, and wherein the one or more processors are configured to detect an edge of the spot by identifying boundaries where a first pixel of a pair of adjacent pixels are at or above a threshold illumination value and a second pixel of a pair of adjacent pixels are below the threshold illumination value, and determine a centroid of the spot based on the detected edge of the spot. The one or more processors can be further configured to determine an amount that the input device has lifted off of the underlying surface based on the location of the determined centroid of the spot on the plurality of pixels. Some embodiments may include an inertial measurement unit (IMU) with an accelerometer, where the one or more processors are further configured to determine whether the input device has been lifted vertically from the underlying surface or tilted off of the underlying surface based, in part, on inertial data received from the IMU and the location of the centroid of the spot on the plurality of pixels. The light source module can include an infra-red LED. In some cases, the input device can further include a first lens configured to direct light from the light source module towards the underlying surface and a second lens configured to direct the reflected light off of the underlying surface to the first set of pixels of the image sensor when the input device is operating on the underlying surface. In some cases, the reflected light substantially overfills the first set of pixels and not the second set of pixels while the input device is operating on the underlying surface, the reflected light substantially fills at least a majority portion of the second set of pixels when the input device is lifted or tilted off of the underlying surface.

Some embodiments can include a method of operating an input device, the method comprising: generating a light beam by a light source module controlled by one or more processors of the input device; steering the light beam towards a target location, wherein the target location corresponds to a spot on an underlying surface while the input device is operating on the underlying surface; steering a reflected light beam that is reflected off of the underlying surface towards an image sensor of the input device; receiving the reflected light beam by the image sensor, the image sensor controlled by the one or more processors; generate tracking data by the image sensor that corresponds to a two-dimensional (2D) movement of the input device with respect to the underlying surface based on the received reflected light beam; determine that the input device is operating on and in contact with the underlying surface when the reflected light beam received by the image sensor is located on a first set of pixels of a plurality of pixels of the image sensor; and determine that the input device is operating above and not in contact with the underlying surface when the reflected light beam received by the image sensor is located on a second set of pixels of the plurality of pixels of the image sensor. In some implementations, the first set of pixels forms a square shape that receives the reflected light from the light source module when the input device is operating on the underlying surface, where the second set of pixels is adjacent to the first set of pixels such that the first set of pixels and the second set of pixels together form a rectangle, and where the second set of pixels is configured at a location relative to the first set of pixels such that the reflected light from the light source module moves from the first set of pixels to the second set of pixels as the input device is lifted off of the underlying surface. The light source module can form a spot on the first set of pixels when the input device is operating on the underlying surface, and the method can further comprise: detecting an edge of the spot, by the one or more processors, by identifying boundaries where a first pixel of a pair of adjacent pixels are at or above a threshold illumination value and a second pixel of a pair of adjacent pixels are below the threshold illumination value; and determining a centroid of the spot, by the one or more processors, based on the detected edge of the spot.

In further embodiments, the method can further include determining, by the one or more processors, an amount that the input device has lifted off of the underlying surface based on the location of the determined centroid of the spot on the plurality of pixels. The input device may further comprises an IMU with an accelerometer, wherein the method further includes: determining whether the input device has been lifted vertically from the underlying surface or tilted off of the underlying surface based, in part, on inertial data received from the IMU and the location of the centroid of the spot on the plurality of pixels. In some embodiments, the input device further includes an illumination lens and an imaging lens, wherein the steering the light beam towards a target location is performed by the illumination lens, and wherein the steering a reflected light beam that is reflected off of the underlying surface towards an image sensor is performed by the imaging lens. In certain embodiments, the reflected light substantially overfills the first set of pixels and not the second set of pixels while the input device is operating on the underlying surface, and wherein the reflected light substantially overfills the second set of pixels when the input device is lifted or tilted off of the underlying surface.

In certain embodiments, a system for operating an input device comprises: one or more processors; and one or more machine-readable, non-transitory storage mediums that include instructions configured to cause the one or more processors to perform operations including: generating a light beam by a light source module controlled by one or more processors of the input device; steering the light beam towards a target location, wherein the target location corresponds to a spot on an underlying surface while the input device is operating on the underlying surface; steering a reflected light beam that is reflected off of the underlying surface towards an image sensor of the input device; receiving the reflected light beam by the image sensor, the image sensor controlled by the one or more processors; generate tracking data by the image sensor that corresponds to a two-dimensional (2D) movement of the input device with respect to the underlying surface based on the received reflected light beam; determine that the input device is operating on and in contact with the underlying surface when the reflected light beam received by the image sensor is located on a first set of pixels of a plurality of pixels of the image sensor; and determine that the input device is operating above and not in contact with the underlying surface when the reflected light beam received by the image sensor is located on a second set of pixels of the plurality of pixels of the image sensor. In some embodiments, the first set of pixels forms a square shape that receives the reflected light from the light source module when the input device is operating on the underlying surface, wherein the second set of pixels is adjacent to the first set of pixels such that the first set of pixels and the second set of pixels together form a rectangle, and wherein the second set of pixels is configured at a location relative to the first set of pixels such that the reflected light from the light source module moves from the first set of pixels to the second set of pixels as the input device is lifted off of the underlying surface. In some embodiments, the instructions are further configured to cause the one or more processors to perform operations including: determining a surface type of the underlying surface; in response to determining that the surface type is a high contrast surface, utilizing both the first and second set of pixels for tracking the location of the reflected light beam; and in response to determining that the surface type is a low contrast surface, utilizing only the first set of pixels for tracking the location of the reflected light beam.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 9 shows aspects of lift detection for an input device, according to certain embodiments.

The detailed description is set forth with reference to the accompanying figures. Throughout the drawings, it should be noted that like reference numbers are typically used to depict the same or similar elements, features, and structures.

DETAILED DESCRIPTION

Figure 1:
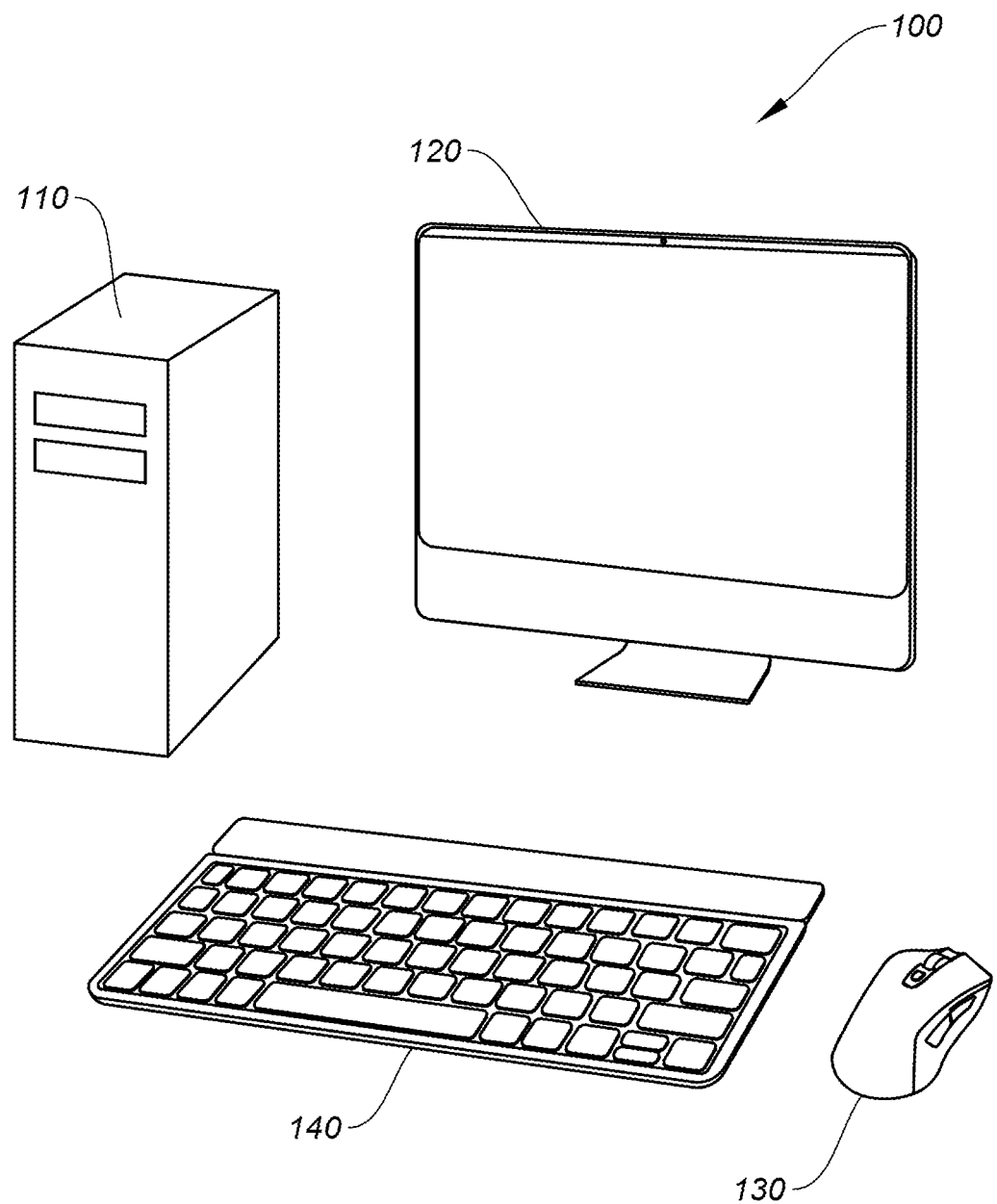
FIG. 1 shows a simplified diagram of a computer system, according to certain embodiments.

Aspects of the present disclosure relate generally to computer peripheral devices, and more particularly to lift detection with input devices, according to certain embodiments.

In the following description, various examples of lift detection with input devices are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding description provided below. Over years of development and improvement, image sensors in input devices (e.g., computer mice) with optical tracking systems have become increasingly more efficient. In the early 2000s, optical tracking systems typically employed red LEDs configured at ~25° (with respect to the surface) with diffuse optical emissions that allowed for a vertically positioned image sensor, however surface coverage (e.g., surfaces that allowed for reliable detection) was often limited to structured surfaces that, when illuminated by the LED, produced an illuminated spot with shadows that the sensor is able to capture and correlated between successive images. In such systems, the low-angle LED beam typically produces a large spot on the underlying surface (e.g., mouse pad) that the image sensor can reliably detect, even when the input device is lifted by a small amount. This ability to detect movement of the input device while it is lifted is called lift-off detection (LoD). For low-angle, diffuse-emission LEDs, lift-off detection was often possible at up to 3-4 mm. Sensor cutoff (where the sensor can no longer track movement of the input device while lifted) was typically related to a loss of contrast due to sensor features blurring, and diffuse-emission LED systems were highly surface dependent as noted above, with reliable tracking on very structured surfaces (e.g., mouse pads) and unreliable tracking or complete inoperability on myriad non-structured surfaces (e.g., glass tables, smooth surfaces, etc.) that did not create detectable shadows, as would be appreciated by one of ordinary skill in the art with the benefit of this disclosure.

As tracking technology developed, some input devices employed lasers with highly collimated light with specular optical tracking configurations with an optical sensor arranged along the specular reflection angle for movement tracking rather than the earlier vertically positioned designs that took advantage of the diffuse nature of early LED emission patterns. The highly collimated spot created by a laser can be significantly smaller than early LED-based spot and can capture more surface details of the underlying surface rather than simply generating shadows that the image sensor can detect and correlate. As a result, one advantage of laser-based systems is the ability to track on myriad surface types including smooth surfaces and, in some cases, glass surfaces. Power efficiency in laser-based systems can be improved over its LED-based predecessors due to the comparatively small spot and low current source requirements used to the drive the laser. Also, given the small size of the spot compared to the sensor array that it is trained on during use, the spot may remain within the sensor array as the input device is lifted with LoD thresholds that often range from 3-5 mm.

In modern devices, laser-based sensing gave way to improved LED-based systems with specular configurations (e.g., made possible by send/receive lensing apparatuses) that further broaden surface type usage and further improves power efficiency. Eventually, infra-red (IR) LEDs have been used in specular emission LED systems for a variety of reasons including further improved power efficiency, low forward voltage characteristics (e.g., 1.45 V), tracking coverage, and cost. One drawback associated with the improved LED-based systems is that although the specular configuration produces a much smaller spot than LED-based systems with diffuse emission patterns (however still extracts information of the underlying surface due to the nature of the specular reflection), the spot can be much larger than the laser-based counterparts such that the spot can move off of the image sensor when the input device is lifted more quickly, resulting in lower LoD thresholds (e.g., 2-3 mm), which could be highly dependent on underlying surface characteristics. In 2014, Logitech® pioneered further improvements in the LED-based, specular emission systems that further improved power consumption and employed a surface tuning feature that permitted a user to adjust the LoD for specific surface types (e.g., mouse pads) that could be as low as 1 mm, which was popular in the e-sports community. Some contemporary designs include improved lenses that further reduce the size of the spot and improve power efficiency with LoD ranging from 0.8-1.1 mm. Although a low LoD may be preferred for a number of operational reasons (e.g., improved power efficiency, tracking, etc.), many gamers became accustomed to diffuse-type LED systems and often used input device manipulation techniques that included slight lifting (e.g., "skating") and/or tilting of the input device several millimeters while in use rather than keeping the input device well in contact with the underlying surface, which did not have particularly strong deleterious effects on the diffuse-type LED systems with relatively the high LoD thresholds. However, when skating and tilting movements are applied to specular-type LED systems with lower LoD thresholds, deleterious effects such as parasitic tracking phenomena may be introduced (e.g., resulting in spurious cursor tracking) that can be hard to anticipate and/or correct when the input device is not well in contact with an underlying surface. This problem affects all contemporary IR LED specular-based input devices (e.g., computer mice) introduced since 2014, and no effective solutions have been introduced before the various embodiments presented in the present disclosure. Thus, aspects of the present invention are directed to enabling a wider working range (e.g., greater LoD range) in combination with a spot position detection capability, detecting characteristics of an underlying surface, or a combination thereof, in a manner that is transparent to the user and with no user-discernable degradation in tracking quality or reliability.

In contemporary designs (e.g., high end gaming mice), sensor sizes have remained relatively large to allow for higher resolution and high speed and acceleration tracking. Typically, the reflected light spot fills the image sensor, which is ubiquitously a square shaped sensor comprised of a plurality of pixels in conventional input devices, such that the spot illuminates all (overfills) or nearly all of the pixels in the image sensor as the input device operates under typical modes of operation (e.g., tracking two-dimensional (2D) movement of the input device relative to an underlying surface). Utilizing as many pixels as possible on the image sensor allows for improved tracking accuracy, resolution, and efficiency, as would be appreciated by one of ordinary skill in the art with the benefit of this disclosure. Unused pixels that do not receive reflected light during normal operation of the input device can needlessly waste power in conventional devices, thus the spot (usually a circle) is typically configured to "overfill" the image sensor (historically a square) to ensure that most of the pixels are illuminated and utilized. A typical size ratio of the spot to the plurality of pixels is 1.2:1 (e.g., 120%) in contemporary computer mice.

Although power efficiency and performance over varying surfaces has substantially improved over the years with newer specular-type LED systems, one negative consequence is that image sensor-based lift detection accuracy has reduced, as noted above. That is, the practice of using an image sensor configured for 2D surface tracking (e.g., along an X-Y plane) to also detect when the input device is lifted off of the surface (e.g., tracking a "Z-height") has gotten progressively worse. As described above, in some earlier diffuse-based LED systems, the spot may not have completely filled the square array (e.g., in some designs, the spot only filled ¼ of the pixel array), so that when the input device was lifted, the spot proportionally moved along the image sensor but still illuminated a number of the pixels until the input device was lifted and/or tilted to a height (threshold) where the spot moved off of the image sensor and movement tracking was no longer possible. In practical applications, a user could lift the computer mouse, move it, and place it back down (e.g., moving the input device from the edge of a mouse pad and back to a center point, known colloquially as "skating") and still accurately track the X-Y movement relative to the underlying surface, even when the input device was lifted up to a threshold height because the reflected light spot was still illuminating pixels on the image sensor. Because modern specular-based input devices substantially overfill the image sensor such that a very small amount of lift will cause the reflected spot to move off or mostly off of the image sensor, the input device will lose X-Y tracking accuracy, which can manifest as spurious tracking (e.g., where a computer mouse-controlled cursor appears to randomly jump to different locations), introduce inaccurate movement artifacts (e.g., jitter), or the like. These types of deleterious tracking conditions are considered unacceptable in modern input devices, so contemporary designs often employ a secondary tracking system design specifically for lift detection (e.g., only tracking Z-height) to address these performance issues.

Figure 8:
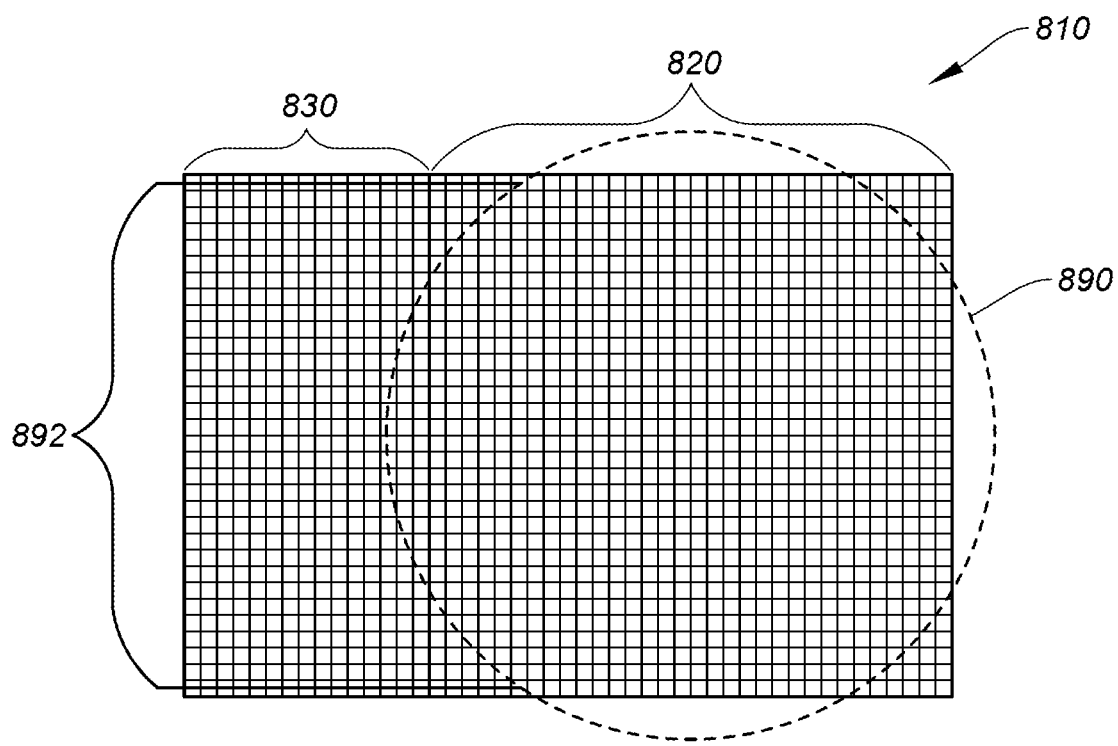
FIG. 8 shows an improve pixel array for an image sensor circuit, according to certain embodiments.

Aspects of the invention solve this problem by extending the pixel array to have a nominal position (e.g., a square array of pixels 820) where the spot (890) illuminates the pixels (e.g., overfilling pixels 820) while the input device operates on and along an underlying surface (e.g., as shown in FIG. 8), and an extended position (e.g., pixels 830) that the spot transitions to (traverses to) as the input device is lifted off of the underlying surface (e.g., as shown in FIG. 9). Thus, the same sensor array can be used for accurate and efficient 2D tracking along an underlying surface and, using the same sensor array, accurate lift detection and tracking in a lifted state can be performed without requiring any additional and independent lift detection systems, as found in other contemporary systems. That is, the spot moves along the image sensor array from the first set of pixels 820 to the second set of pixels 830 of the same array 810, thereby extending a tracking compute window (e.g., tracking a spot centroid), as further described in the description below, and increasing the working range of the input device (e.g., allowing a user to skate the input device with substantially reduced or eliminated deleterious effects). As described above, image sensors have historically been square-shaped to optimally match the spot. The rectangular shape of the image sensor (e.g., as shown and described below with respect to FIGS. 8-9) has not been used in contemporary or historical designs, as during normal circumstances while the input device is moving on an underlying surface, the extended portion of the image sensor (830) would not be utilized, which would result in reduced power efficiency, a greater circuit footprint, and higher manufacturing costs. Contemporary solutions to this issue typically involve an additional second sensor system dedicated to lift detection. Consequently, such designs may detect when a lift condition occurs, but they do not allow for any change or improvement in 2D tracking, which may add a limited benefit of causing the input device to know when to stop tracking to prevent spurious detection. Thus, adding more pixels to extend the square-shaped image sensor in a direction to track the spot as it traverses along the pixel array would not be an obvious solution for the issue of lift detection for the various efficiency reasons given above and as evidenced by the fact that a rectangular image sensor configured in this manner has never been used before, and such new extended arrays provide the substantial benefit of allowing good tracking accuracy at increased z-heights on a single system to increase a working range of the input device, which includes 2D tracking in a lifted state to accommodate common practices like skating, tilting, and the like, with reduced or eliminated deleterious tracking effects, as noted above. Furthermore, aspects of the invention can utilize the extended array to not only determine when a lift or tilt condition occurs, but can be programmed to set a LoD threshold that can allow a gamer to customize how the input device operates when lifted.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

Typical System Environment

FIG. 1 shows a simplified diagram of a computer system 100, according to certain embodiments. Computer system 100 can include computer 110, monitor 120, input device 130, and keyboard 140. In some embodiments, input device 130 can be a computer mouse, a remote control device, a game controller (e.g., game pad, joystick, etc.), a smart phone, or other suitable device that can be used to convert analog inputs into digital signals for computer processing.

For computer system 100, input device 130 can be configured to control various aspects of computer 110 and monitor 120.

Although the host computing device is shown as a laptop computer, other types of host computing devices can be used including gaming systems, desktop computers, set top boxes, entertainment systems, a tablet or "phablet" computer, or any other suitable host computing device (e.g., smart phone, smart wearable, or the like). In some cases, multiple host computing devices may be used and one or more of the peripheral devices may be each communicatively coupled to one or more of the host computing devices (e.g., a mouse may be coupled to multiple host computing devices). A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device(s) to control aspects of the host computing device via the one or more peripheral input devices.

A typical peripheral device can include any suitable input peripheral device, output peripheral device or input/output peripheral device including those shown (e.g., a computer mouse) and not shown (e.g., game controller, remote control, wearables (e.g., gloves, watch, head mounted display), AR/VR controller, stylus device, gaming pedals/shifters, or other suitable device) that can be used to convert analog inputs into digital signals for computer processing. In some embodiments, computer peripheral device 130 can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art.

A computer peripheral device may be referred to as an "input device," "peripheral input device," "peripheral," or the like. The majority of the embodiments described herein generally refer to computer peripheral device 130 as a computer mouse or similar input device, however it should be understood that computer peripheral device 130 can be any suitable input/output (I/O) device (e.g., user interface device, control device, input unit, or the like) that may be adapted to utilize the novel embodiments described and contemplated herein.

Typical System Embodiment for Operating an Input Device

Figure 2:
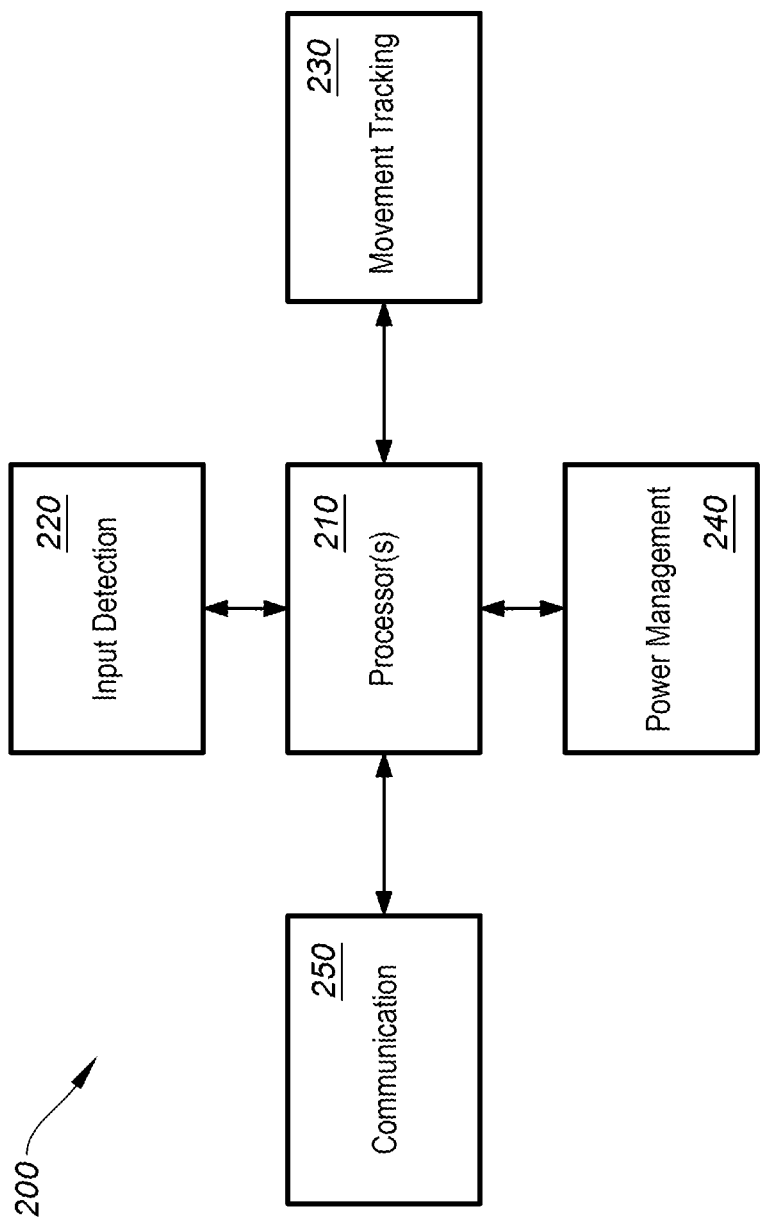
FIG. 2 shows a simplified block diagram of a system to operate an input device, according to certain embodiments.

FIG. 2 shows a simplified block diagram of a system 200 to operate input device 130, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein. System blocks 220-250 (also referred to as "modules") may be implemented as separate modules, or alternatively, more than one system block may be implemented in a single module. In the context described herein, system 200 can be incorporated into any computer peripheral device described herein and may be configured to perform any of the various methods of lift detection as described below at least with respect to FIGS. 5-10, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 130 (e.g., system blocks 220-250). Alternatively or additionally, some of system blocks 220-250 may include an additional dedicated processor, which may work in conjunction with processor(s) 210. For instance, MCUs, μCs, DSPs, and the like, may be configured in other system blocks of system 200. Communications block 250 may include a local processor, for instance, to control aspects of communication with computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., method 1000) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Input detection module 250 can control the detection of a user-interaction with input elements (also referred to as "input members") on computer peripheral device 150. Input detection block 220 can detect user inputs from motion sensors, keys, buttons, roller wheels, scroll wheels, track balls, touch pads (e.g., one and/or two-dimensional touch sensitive touch pads), click wheels, dials, keypads, microphones, GUIs, touch-sensitive GUIs, image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection block 220 can be subsumed by processor 210, or in combination therewith.

In some embodiments, input detection block 220 can detect a touch or touch gesture on one or more touch sensitive surfaces on input device 130. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 130 may or may not utilize touch detection or touch sensing capabilities.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

In some embodiments, input detection block 220 may also control some output functions of input device 130, such as a number of visual output elements (e.g., mouse cursor, LEDs, LCDs), displays, audio outputs (e.g., speakers), haptic output systems, or the like. One of ordinary skill in the art with the benefit of this disclosure would appreciate the many modifications, variations, and alternative embodiments thereof.

Figure 4:
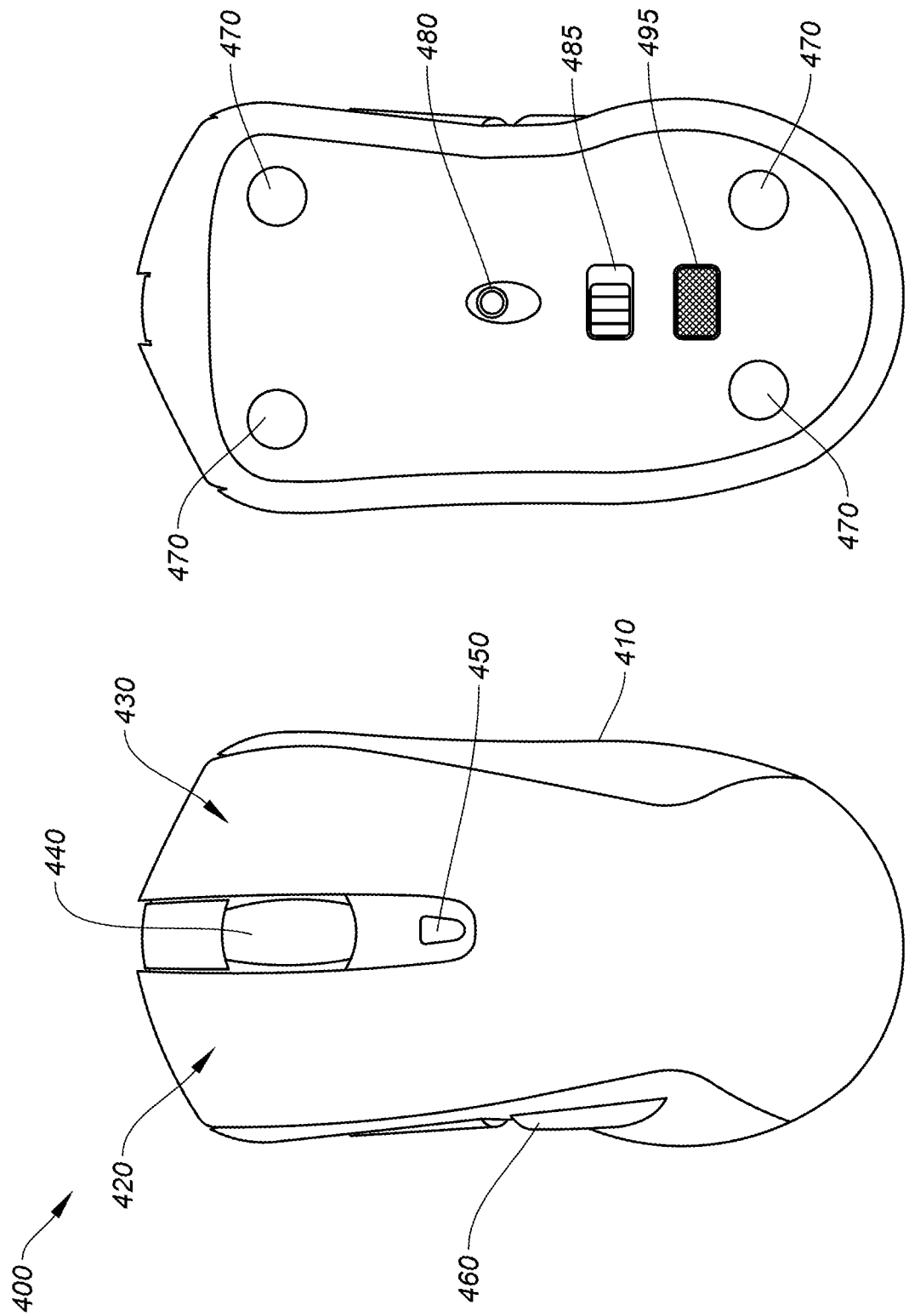
FIG. 4A shows aspects of an input device, according to certain embodiments.
FIG. 4B shows aspects of a bottom portion of input device, according to certain embodiments.

Movement tracking block 230 can be configured to track a movement of input device 130. Movement tracking block 230 can use optical sensor systems that utilize a light-emitting diode(s) (LEDs) and an imaging array of photo-diodes (referred to individual as "pixels" and collectively as a "pixel array") to detect a movement of input device 130 relative to an underlying surface. Input device 130 may optionally include movement tracking hardware that utilizes coherent (laser) light. In certain embodiments, an optical sensor is disposed on the bottom side of input device 130, as shown in FIG. 4B. Movement tracking block 230 can provide positional data (e.g., X-Y coordinate data) and lift detection data. For example, an optical sensor can detect when a user lifts input device 130 off of a underlying surface and can send that data to processor 210 for further processing. In some embodiments, processor 210, movement tracking block 230 (which may include an additional dedicated processor), or a combination thereof may perform some or all of the novel functions described herein including processing different set of pixels of a plurality of pixels of an image sensor to determine when the input device is lifted off of an underlying surface, as described below at least with respect to FIGS. 8-10.

In certain embodiments, an inertial measurement unit (IMU) can be used to both movement and lift detection. An IMU may incorporate one or more accelerometers and/or gyroscopes, among other devices for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." As noted above and further described below, accelerometers can further determine if input device 130 has been lifted off of a surface and provide movement data that may include the velocity, physical orientation, and acceleration of input device 130. In some embodiments, gyroscope(s) can be used in lieu of or in conjunction with accelerometer(s) to determine movement or input device orientation.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 120, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
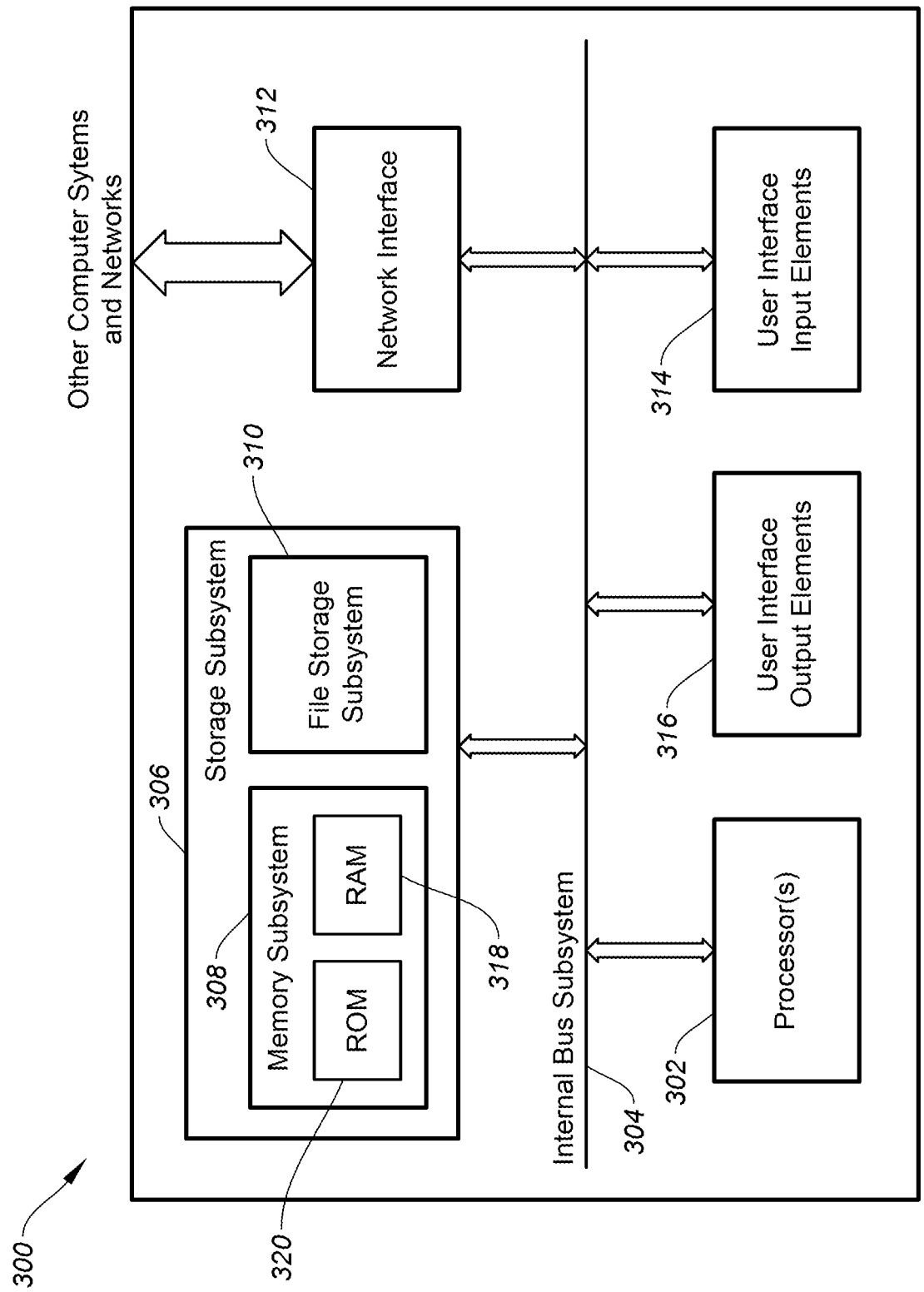
FIG. 3 shows a simplified block diagram of a system to operate a host computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop 110 or laptop computer, mobile device (e.g., tablet computer, smart phone, mobile phone), wearable device, media device, or the like, in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of input device 130, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse 130, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Various Features for Certain Embodiments of an Input Device

FIG. 4A shows aspects of a computer peripheral device 400, according to certain embodiments. Computer peripheral device 400 can include housing 410 (e.g., the "shell," "chassis," or "body" of the computer peripheral device), left button 420, right button 430, scroll wheel 440 and buttons 450, 460, as well as any other suitable input elements (e.g., additional buttons, side scroll wheels, touch sensors, etc.) or output elements (e.g., light emitting diodes (LEDs), displays, haptic feedback elements, speakers, etc.), and the like. In some cases, button 450 may be a mode selection button. For example, button 450 may be depressed to manually indicate that the computer peripheral device is being used on a different surface type. For instance, depressing button 450 may cycle through a series of surface types including gaming mouse pad, standard mouse pad, wood surface, metal surface, glass surface, etc., as further described in U.S. patent application Ser. No. 16/913,391, filed on Jun. 26, 2020, which is incorporated by reference into this application in its entirety for all purposes. Alternatively or additionally, other modes of operation are possible with different performance characteristics, as would be understood by one of ordinary skill in the art. Input device 400 may be input device 130 of FIG. 1.

In some embodiments, buttons 450, 460 may be configured to switch communication between host computing devices. For instance, some embodiments may have multi-host connectivity such that computer peripheral device 400 may communication with a first host computer (e.g., a PC laptop) and switch to a second host computer (e.g., a Mac computer) in response to a corresponding button press, as further described in U.S. patent application Ser. No. 14/884,381, which is incorporated by reference into this application in its entirety for all purposes. Alternatively or additionally, switching between hosts may be achieved by, for example, moving a corresponding cursor to an edge of a display in a "flow" enabled system, as further described in U.S. patent application Ser. No. 15/226,770, which is incorporated by reference into this application in its entirety for all purposes. Buttons 450, 460 or any other computer peripheral devices can be configured in any suitable manner and may utilize any suitable function, which can be pre-set or user programmed (e.g., via corresponding driver software on a host computing device), as would be understood by one of ordinary skill in the art.

FIG. 4B shows aspects of a bottom portion of computer peripheral device 400, according to certain embodiments. The bottom of computer peripheral device 400 can include one or more feet 470, an image sensor 480 (e.g., CMOS sensor using an IR LED lamp), and a power switch 485. Additional input elements (e.g., buttons, sliders, etc.) may be included. In some cases, power switch 485 may be located elsewhere on the mouse or may not be included at all (e.g., computer peripheral device 400 may power up/power down based on usage). Button 495 may be a mode selection switch (e.g., switch for selecting a first mode of operation or a second mode of operation), a multi-host computer selection button, or the like. In some embodiments, button 495 may be a communication protocol selection button. For example, pressing button 495 may switch between a proprietary high-frame rate communication protocol or a lower power lower frame rate communication protocol (e.g., Bluetooth® LE). One of ordinary skill in the art with the benefit of this disclosure would understand the many variations, modifications, and alternative embodiments thereof.

In some embodiments, image sensor 480 is typically located near the center of the bottom portion of computer peripheral device 400, as shown. Image sensor 480 can be a single sensor, but can operate in one or multiple modes of operation (e.g., surface tracking, changing operating parameters to adapt to particular surface types and corresponding surface classifications, as further described below), lift and/or tilt detection, and the like, according to certain embodiments. An image sensor can be a complementary metal-oxide semiconductor (CMOS) sensor that captures images of the underlying surface and sends each image to a processor (e.g., processor 210, on-board processing on the sensor, etc., to perform image correlation and displacement calculations, etc.) for analysis. Other types of image sensors may be used, including charge-coupled devices (CCD), N-type metal-oxide-semiconductors (NMOS), hybrid devices (e.g., CCD/CMOS), or the like, as would be understood by one of ordinary skill in the art. The processor can detect patterns in the images and see how those patterns have moved since the previous image, and based on changes in the patterns over a sequence of images, the processor can determine how far and what direction the corresponding computer peripheral device has moved, which can be sent to the host computer to control one or more functions (e.g., control a cursor on a display, control an audio volume in a music application, etc.). This process can occur many hundreds if not thousands of times per second to accurately detect movement of all types including a range of movement speeds and accelerations. Typically, the image sensor is overfilled by a light source (e.g., IR LED) to utilize as many pixels as possible to achieve good resolution and accuracy. In some embodiments, like that shown in FIG. 8, a first set of pixels (820) of the image sensor (810) is illuminated such that they are overfilled to operate as noted above, and a second set of pixels (830) or a majority thereof are not illuminated and are present to detect when the illumination spot moves due to the input device being tilted or lifted. When such an action occurs, the illumination spot can move to the second set of pixels, which can be used to determine an amount of lift of the input device, as further described below.

To illustrate some basic operational fundamentals of optical sensor-based computer peripheral devices (e.g., input device 130, 400), frame rates and memory slots are briefly described here, as they are some of the performance characteristics (among others) of a computer peripheral device that can be adjusted and optimized for a particular classified surface type, as further described below. In an optical sensor-based computer peripheral device, a "frame rate" can define a frequency at which the image sensor takes images of an underlying surface. Generally, quick movements (e.g., 20 ips or more—typical in a competitive gaming setting) with the computer peripheral device may preferably be detected using a fast frame rate (e.g., 5 kHz or more) to fully capture the movement with accuracy (e.g., how close the measurement is to the actual movement speed and/or acceleration) and precision (e.g., how repeatable an identical measurement is). Likewise, slow movements (e.g., 1-5 ips—typical with productivity software) with the computer peripheral device may be adequately detected with a slower frame rate (e.g., 1 kHz), while still achieving accuracy and precision. Higher frame rates tend to cause the input device (e.g., system 200) to consume more power than do lower frame rates. In some cases, surface conditions can also affect power consumption. For example, surfaces with a high density of surface features (e.g., a gaming mouse pad) may be easier to track movement on as compared to surfaces with few surface features because there are more points of reference for detecting movement. Thus, a computer peripheral device operating on a surface with a low density of surface features (e.g., glass, monochromatic metal surfaces, etc.) may use more light intensity and/or a higher frame rate for a particular movement and/or acceleration than the computer peripheral device operating on a surface with a high density of surface features under the same movement and acceleration conditions.

In certain embodiments, a number of memory slots may be used to correlate movement of the input device with respect to the underlying surface. Memory slots can be used to store images taken by a pixel array in an optical sensor. Input device 400 can use a number of memory slots to save successive image sensor images that are used to detect movement of input device 400 along an underlying surface (e.g., using input detection module 250). At minimum, two memory slots are needed to correlate movement. For instance, a first page (saved to a first memory slot) may include a surface feature or particle and a second page (saved to a second memory slot) may include the same surface feature or particle, but captured at a difference time wherein, if input device 400 is moved, the same surface feature or particle will be located a distance from the position shown in the first page. Note that a "page" can be referred to as an "image" for purposes of this disclosure. The detected difference of location is used to interpolate a movement of the input device with respect to the underlying surface, as would be understood by one of ordinary skill in the art. "Memory slots" may be interchangeably referred to as "memory blocks," (not to be confused with memory "block" 220) "memory pages," "memory cells," and the like. The memory slots may be part of and/or controlled by processor 210, input detection module 250, or a combination thereof. In some cases, memory slots may be stored on external memory (e.g., external to processor 210 and/or movement tracking block 230) and controlled by one or more resources of system 200. In certain embodiments, the memory slots are stored on the image sensor silicon and may be controlled by image sensor 480, processor 210, or a combination thereof. In some cases, the image sensor can be subsumed, wholly or in part, by input detection module 220. One of ordinary skill in the art would understand the many variations, modifications, and alternative embodiments thereof.

A Typical Image Sensor Architecture According to Certain Embodiments

Figure 5:
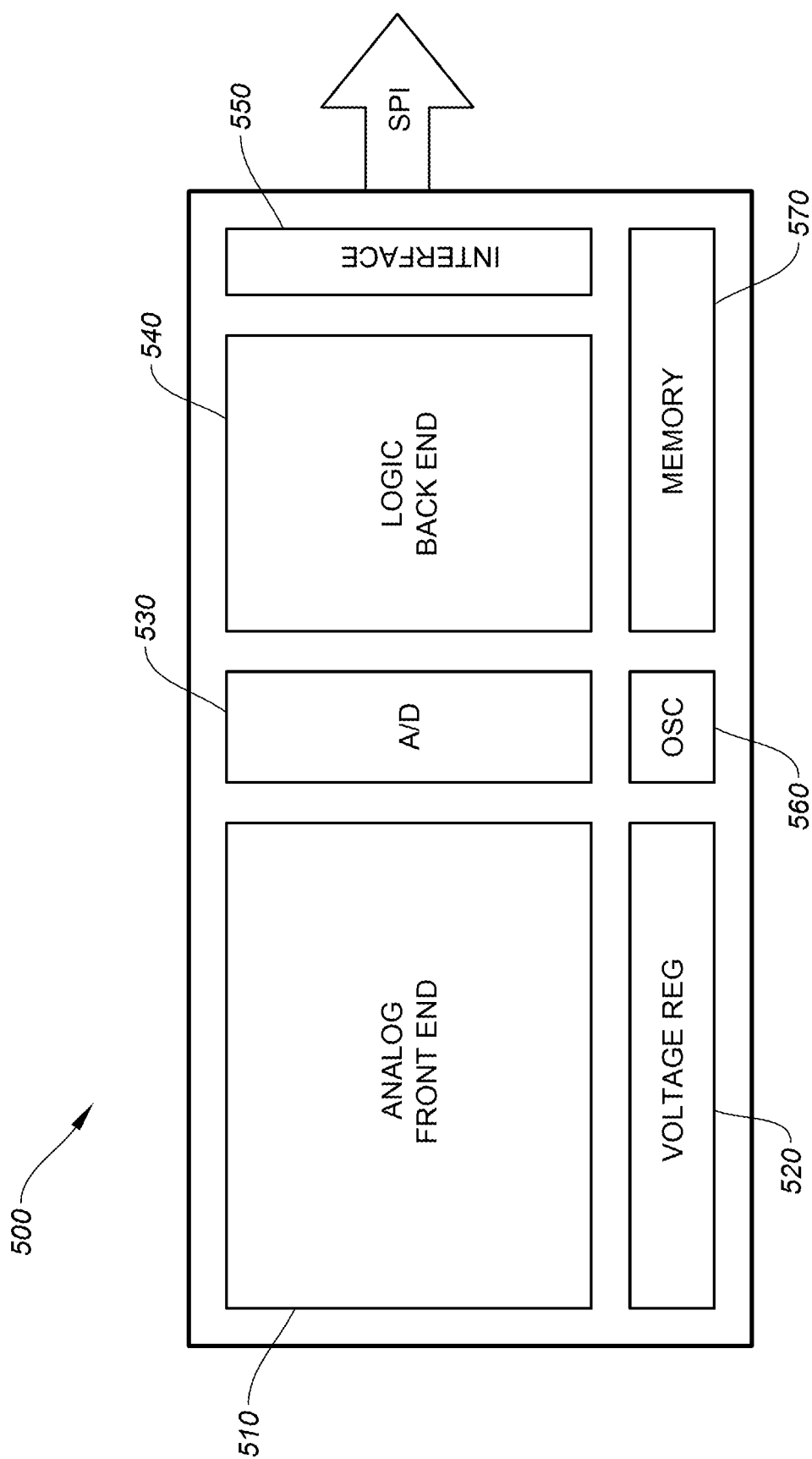
FIG. 5 shows a simplified block diagram of an image sensor circuit, according to certain embodiments.

FIG. 5 shows a simplified block diagram of an image sensor circuit 500, according to certain embodiments. Image sensor circuit 500 may be included in system 200 as part of input detection block 220, processor 210, a combination thereof, as its own entity, or the like. Image sensor circuit 500 can perform aspects of 2D tracking on an underlying surface and lift detection of input device 400, as described herein and may include an analog front end 510, a voltage regulator block 520, an analog-to-digital (A/D) converter 530, a logic back end 540, an interface block 550, an oscillator circuit 560, and memory block 570, among other features.

Analog front end 510 may include an extended pixel array 810 comprising a plurality of pixels, as shown in FIG. 8. The pixel array can be configured and aligned such that an illumination spot is aligned on a first set of pixels 820 of the plurality of pixels during normal operation where the input device is operating on and along an underlying surface, and moves to a second set of pixels 830 as the input device is lifted, where the illumination spot is sourced by a light source that projects light that is bounced off of the underlying surface, as further described below. Voltage regulator block 520 can include various system and methods for performing voltage regulation on image sensor circuit 500. A/D converter 530 can be configured to convert analog signals, generated by the plurality pixels in response to photons striking their surfaces, into digital signals that are output to logic backend 540 for further processing. Although not shown, A/D converter 530 can include a number of system blocks including multiplexors and comparators to address (multiplex/demultiplex) and convert each analog input (e.g., successive images taken by the analog front end (e.g., pixel array 810) into a digital signal for processing by logic backend 540 (or processor 210, or a combination thereof), as would be understood by one of ordinary skill in the art with the benefit of this disclosure. Based on the individual currents from each pixel, the border (edge) of the illuminated spot where a threshold current value is reached, etc., can be determined and the corresponding centroid of the spot and Z height of the input device can be calculated by logic backend 540, as described below. Typically, the pixel current pulse is proportional in magnitude to its corresponding illumination. Oscillator block 560 generates one or more reference and/or driver signals for image sensor circuit 500. Memory block 570 can include a number of memory slots to store pages of image data, as described above, or data corresponding to various modes of operation of image sensor circuit 500, such as operating extended pixel array 510 in a first mode (e.g., office mode) where a first set of pixels (e.g., pixels 820) are used during operation, or a second mode (e.g., gaming mode) where a second set of pixels (e.g., pixels 820+830) are used, for instance. Interface 550 can operate to allow image sensor circuit 500 to communicate with other systems within input device 400. Image sensor circuit 500 may incorporate one or more busses to provide power and/or communicatively connect the various system block of image sensor circuit 500.

Figure 6:
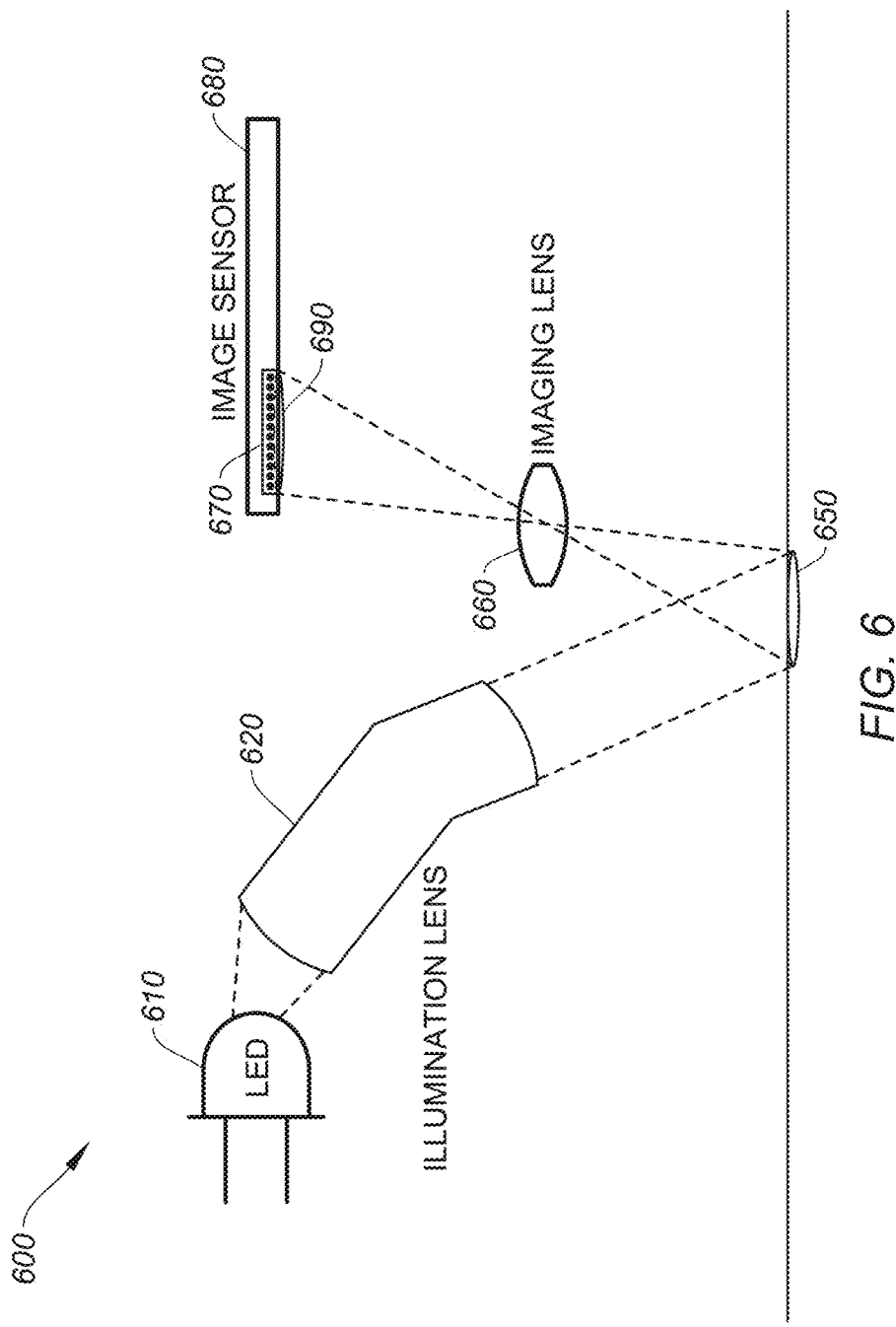
FIG. 6 shows a simplified diagram of aspects of a movement tracking system for an input device, according to certain embodiments.

FIG. 6 shows a simplified diagram of aspects of a movement tracking system 600 for an input device 400, according to certain embodiments. Movement tracking system 600 can include a light source 610, an illumination lens 620, an imaging lens 660, and an image sensor circuit 680. Light source 610 may be any suitable source including an IR LED. Illumination lens 620 can be configured to steer and/or focus a light beam from the light source to a target location. In some cases, the target location can be a location 650 on an underlying surface while the input device is operating on the underlying surface, according to certain embodiments. Imaging lens 660 may be configured to steer and/or focus the reflected light beam that is reflected off of the underlying surface towards a pixel array 670 of image sensor 680 forming a spot 690. The image sensor circuit 680 can be configured to generate tracking data by the image sensor that corresponds to a two-dimensional (2D) movement of the input device with respect to the underlying surface based on the received reflected light beam, as further described below.

Figure 7:
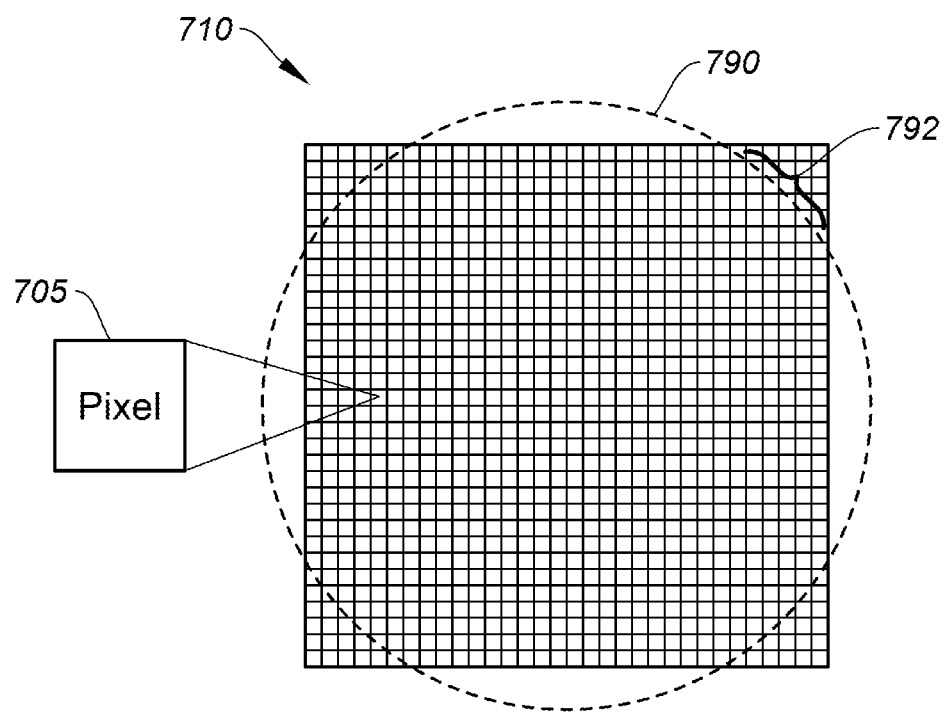
FIG. 7 shows a pixel array for a conventional image sensor circuit.

FIG. 7 shows a pixel array 710 for a conventional image sensor circuit. Pixel array 710 can be a complementary metal-oxide semiconductor (CMOS) sensor that captures images of the underlying surface and sends each image to a processor (e.g., processor 210, logic backend 540, etc., to perform image correlation and displacement calculations, etc.) for analysis. Other types of image sensors may be used, including charge-coupled devices (CCD), N-type metal-oxide-semiconductors (NMOS), hybrid devices (e.g., CCD/CMOS), or the like, as would be understood by one of ordinary skill in the art. In conventional designs, pixel array 710 it typically comprised of a plurality of individual pixels 705 of any suitable size that form a square shape. Referring to FIG. 7, a 32×32 pixel matrix 710 is shown. Generally, the more pixels used in the pixel matrix, the more accurate and higher the speed of detected movement can be, at the cost of greater processing resources (e.g., requiring logic backend 540 and/or processor 210 to process greater amounts of data) in addition to greater power consumption. In some cases, some rows and columns of pixels may be omitted in tracking calculations to simplify tracking calculations and improve performance. For instance, edge pixels may not have similar pixel neighbor conditions as center pixels, which can require additional computational resources to reconcile those differences. Thus, in some embodiments, some or all of the data from edge pixels can be discarded from the correlation computation. One of ordinary skill in the art with the benefit of this disclosure would understand the many variations, modifications, and alternative embodiments thereof.

Typically, a light beam is emitted by a light source, reflected off of an underlying surface, and directed to the pixel array to track a movement of the input device relative to the underlying surface by capturing "pages" of images of the underlying surface in rapid succession and analyzing and comparing a movement of various surface features (e.g., particles, surface feature variations, etc.) relative to the input device to determine displacement. Generally, the greater the number of pixels used in tracking, the greater the resolution and accuracy of movement detection at the cost of greater power dissipation and processing bandwidth. Thus, optical devices typically utilize as many pixels as possible on the image sensor by "overfilling" the pixel array with the reflected light, which typically forms a round illuminated "spot" 790 on the pixel array. The alignment of the spot 790 on the pixel array is usually done at the manufacturing stage. Image arrays can be a significant cost in an overall manufacturing cost of an optically tracked input device, so maximizing the number of usable pixels on an array is also advantageous from a cost perspective as well. Utilizing a spot that is smaller than the pixel array would not be conventionally practiced because it would produce a reduction in image resolution and tracking accuracy and would be a waste of image sensor cost (for the extra unused pixels) and image sensor "real-estate," which can make up a significant portion of the input device. Thus, if a manufacturer wanted to use a smaller spot, their bill of materials would simply call for a smaller pixel array and corresponding image sensor circuit. In summary, conventional designs typically overfill the image sensor to take advantage of as many pixels as possible on the pixel array for the best possible resolution and tracking experience.

Overfilling the standard square-shaped pixel array with the reflected light can be advantageous for tracking 2D movement of the input device along an underlying surface, but also can make lift detection and tracking while the input device is lifted using the same pixel array unreliable and impracticable. One way to perform lift detection using a pixel array is to detect an edge or edges of the spot illuminating the pixel array, determine a centroid of the spot based on the detected edge, and detect how the centroid moves, which may correlate to how much the input device has lifted. The edges 792 are detected by identifying boundaries where a first pixel of a pair of adjacent pixels are at or above a threshold illumination value (e.g., the spot illuminates the pixel) and a second pixel of the pair of adjacent pixels are below the threshold illumination value (e.g., the spot does not illuminate the pixel). This can be done at every pair of adjacent pixels that are above/below the threshold value, as described above, or at a subset thereof. The centroid can be determined (e.g., interpolated) based on the identified boundaries. The determination of the edge and centroid can be performed in a variety of ways, as would be appreciated by one of ordinary skill in the art with the benefit of this disclosure. As shown in FIG. 7, the spot mostly overfills the pixel array (e.g., to achieve optimal resolution, tracking, and pixel usage efficiency) with boundaries shown near the four corners of the pixel array. When the input device is lifted even a small amount due to input device tilting or skating (e.g., 2-5 mm), the spot can move substantially or completely off of the square pixel array 710 such that fewer edges or no edges can be detected, which can lead to spurious tracking, in accurate lift detection due to the inability to accurately track the centroid, or other deleterious (parasitic) effects. Aspects of the invention relate to an extended pixel array (e.g., pixel array 810) that allow for extended tracking of the centroid resulting in accurate lift detection over a higher range (e.g., 5 mm or more) and continued 2D tracking along the underlying surface while the input device is lifted.

FIG. 8 shows an improve pixel array 810 for an image sensor circuit, according to certain embodiments. Pixel array 810 can be a CMOS, CCD, NMOS, CCD/CMOS, or other suitable type of image sensor technology. Referring to FIG. 8, pixel array 810 is rectangular and includes a plurality of pixels including a first set of pixels 820 (e.g., 32×32 pixels) that form a square, and a second set of pixels 830 (e.g., 15×32 pixels) configured adjacent to the first set of pixels that extend the square in a direction that the centroid moves to as the input device is lifted off of the underlying surface. As shown in FIG. 8, the second set of pixels 830 extends the pixel array 810 to the left side of the first set of pixels 820, however the extension of the pixel array can be configured in any direction that preferably allows the pixel array 810 to track continue to track the illuminated spot as it moves across the pixel array in correspondence to an amount that the input device is lifted off of the underlying surface, as would be appreciated by one of ordinary skill in the art with the benefit of this disclosure.

As described above with respect to FIG. 7, conventional square pixel arrays are overfilled by the illuminated spot (e.g., 1.2:1) such that the edges of the illuminated spot can be challenging to locate, as well as the corresponding centroid, as there typically few edges 792 that fall within the pixel array, and any movement of the spot due to the input device being lifted off of an underlying surface would be very difficult, if not impossible, and would require highly sophisticated algorithms and processing power to track the centroid of the illuminated spot (also referred to as an "illumination spot") with a requisite amount of consistency or accuracy because the edges of the illuminated spot begin to move off of the pixel array as the input device is lifted, and any lift beyond 1-2 mm would make tracking the lift, or much less tracking 2D movement on the underlying surface, to be practically not possible as very few pixels, if any, would be illuminated making the tracking resolution and accuracy fall below any acceptable performance levels.

The extension of the first set of pixels 820 with the second set of pixels 830 allows the spot to be tracked to 5 mm or more as the edges of the illuminated spot can be tracked as the centroid moves from the first set of pixels to the second set of pixels. In some aspects, the entire pixel array 810 can be tracked at all times and in real-time to ensure that the illuminated spot can be tracked in response to frequent skating, tilting, etc., while in use. In some aspects, the second set of pixels may not be read until there is some indication in the first set of pixels that a lift detection condition exists, which gains the benefit of having a greater working distance (e.g., accurate tracking in a lift detect condition) of the input device, while conserving power by not accessing/reading the pixels of the second set of pixels 830 until lift detection and tracking is needed. Although two sets of pixels are shown, the additional pixels can be represented in any suitable fashion (e.g., one additional set of pixels, two additional sets of pixels, quadrants of pixels, etc.). One of ordinary skill in the art with the benefit of this disclosure would appreciate the many modifications, variations, and alternative embodiments thereof.

FIG. 9 shows aspects of lift detection for an input device 400, according to certain embodiments. Input device 400 is shown in a first position at time $t_1$ when input device 400 is operating on an underlying surface, and a second position $t_2$ when input device 400 is lifted and/or tilted (e.g., 2 mm as shown) off of the underlying surface. As described above, a light source (e.g., IR LED) projects a light beam that is steered to a target location on the underlying surface. The reflected light from the target location is directed to the image sensor, where the light preferably overfills and illuminates a first set of pixels 820, as shown by spot 990. Spot 990 is shown as a circle, although other shapes are possible (e.g., a square), and preferably a shape that utilizes the most pixels in the first set of pixels 820 to maximize movement tracking accuracy and resolution and minimizing the amount of unused pixels. In conventional devices and in embodiments of the present invention, the various lenses (e.g., illumination and image lenses) are aligned at the time of manufacturing to ensure that the spot is centered on the first set of pixels 820 and utilizes most of the pixels in the first set of pixels 820 to ensure good tracking performance characteristics (e.g., typically 1.2:1 for light/pixel array ratio). However, aspects of the present invention further include a second set of pixels 830 that is configured to receive the spot as the spot moves in the direction of the second set of pixels as the input device is lifted.

Referring back to FIG. 9, at $t_1$ the location of the spot can be tracked by identifying edges of the spot and then computing a centroid, as would be appreciated by one of ordinary skill in the art with the benefit of this disclosure. In some embodiments, the centroid computation and tracking may be performed by system 200, 500, or any suitable system or combination of systems described herein. As noted above, a movement of the centroid of the illuminated spot off of a square image sensor can cause parasitic effects that can manifest as non-user-initiated, spurious cursor movement on a display. Typically, the image sensor is overfilled to utilize as many pixels as possible for good tracking accuracy and resolution (e.g., input device movement, velocity, and acceleration). In convention square pixel arrays (e.g., pixel array 710), when a user lifts (e.g., skates) or tilts the input device, the illuminated spot moves off of the image sensor. An edge of the spot can be tracked and typically appears as a transition from a strong illumination signal (the spot) on certain pixels and a sharp decrease in illumination on adjacent pixels. Because fewer pixels are illuminated, tracking accuracy can be reduced (e.g., reduced DPI tracking). More consequentially, in some cases, the pixels that register shade (e.g., illumination below a threshold value—typically pixels where the illumination spot is not trained upon) may be confused with surface features, which can create poor tracking conditions and cause parasitic effects, such as spurious cursor movement. For example, this can be very apparent when tilting a computer mouse in many contemporary devices. When a user tilts the mouse, there is no real movement of the mouse from its present position. Ideally, a cursor would not move on the display when the mouse is stationary but tilted, and the tilt would be ignored. In a typical contemporary computer mouse with a square image sensor with illumination overfill, the tilted condition will cause the spot to move and create pixels with shade. The centroid of the spot may be difficult to ascertain because of the limited number of edge pixels (e.g., detectable on one side and at most two corners only), which can further complicate tracking and/or any potential correction subroutines that may properly evaluate the tilt condition and tracking accordingly (e.g., no cursor movement). For example, if an accurate centroid cannot be detected, particularly while moving when the input device is lifted, it may difficult to determine how the input device is moving relative to an underlying surface because there may be no reliable point of correlation. As an example, features on the underlying surface that are projected within the illumination spot may appear stationary when the input device is not moving. When the input device moves, the detected features may move proportionally, which can inform how to control the cursor in a commensurate manner. However, when the input device is lifted, it may appear that an underlying feature is moving when it is actually the spot that is moving, and this could translate into detected movement. If the system knows how much the input device is lifted (e.g., by tracking the centroid), then the system can compensate using the centroid shift to determine whether movement with respect to the underlying surface actually occurred, as would be appreciated by one of ordinary skill in the art with the benefit of this disclosure. With the addition of an extended pixel array, as shown in FIGS. 8 and 9, a mouse tilt or lift may cause the illumination spot to move onto the extended portion of the array. Because the spot can be tracked on both sides (e.g., right and left side of spot), the centroid can more accurately tracked, and accurate compensation of tracking for the input device can be performed, which can reduce or eliminate any spurious tracking conditions at least during the range on the entire image sensor where the centroid can be accurately tracked.

Referring to FIG. 9, as input device 400 is lifted and/or tilted, the centroid of the illuminated spot moves from position $C_1$ at $t_1$ to position $C_2$ at $t_2$. Note that at each position between $C_1$ and $C_2$, there are four corners of the illuminated spot that are visible, made possible by the pixels in the extended portion of the pixel array 830. Thus, at $t_1$ and $t_2$ and every time in between, an accurate centroid of the illuminated spot can be detected, and accurate movement tracking that compensates for lift can be performed. The accurate detection throughout the LoD range can result in improved DPI in lift-detect conditions, which can result in nominal tracking over a wider range of use.

In some embodiments, input device 400 may operate in different modes of operation. For example, in a first mode of operation (e.g., an "productivity" or "office" mode), it may not matter that there is some spurious movement of the cursor for users working in an office environment and using word processing or spreadsheet applications. In such modes, the additional (extended) set of pixels 830 may not be activated, even when a lift detection event is detected. In a second mode of operation (e.g., gaming mode), accurate tracking may be achieved during a lift-detect event by employing the second set of pixels 830 at all times to minimize or eliminate spurious tracking during skating, tilting, or lifting actions up to the LoD threshold. In some cases, the LoD can be set by a user, which can be modulated by setting the number of pixels 830 used to track the illuminated spot. In some cases, LoD may be set between 1-5 mm, although lower or higher LoD thresholds are possible, which can be based at least in part on the length of the extended set of pixels 830, as would be appreciated by one of ordinary skill in the art with the benefit of this disclosure. In some embodiments, switching between modes may be based on a user input (e.g., pressing a button on the input device that causes the one or more processors 302 and/or logic backend 540 to switch between productivity and gaming modes. In some cases, if the system detects that the input device is operating on a high-contrast surface, such as a mouse pad, the input device may be switched to gaming mode, and if the system detects that the input device is operating on a low-contrast surface (e.g., clear paper, glass surfaces, desks, or uniform color surfaces), the input device may be switched to productivity mode. In some cases, the second set of pixels may only be used/activated in response to determining a lift detection condition using the first set of pixels, such that more accurate tracking is possible by incorporating the second set of pixels during tracking (e.g., resulting in improved DPI during a lift/tilt condition), and also have the benefit of power savings by only powering/polling the second set of pixels when a lift detect event is initially and solely detected via the first set of pixels. Another benefit of the extended pixel array is that during manufacturing when a the illumination spot is calibrated and aimed onto the image sensor over array 820, calibrations that are misaligned can more easily be identified by using the extended portion of the pixel array 830 to more accurately determine the centroid of the illumination spot and determine if the illumination spot needs to be realigned.

Figure 10:
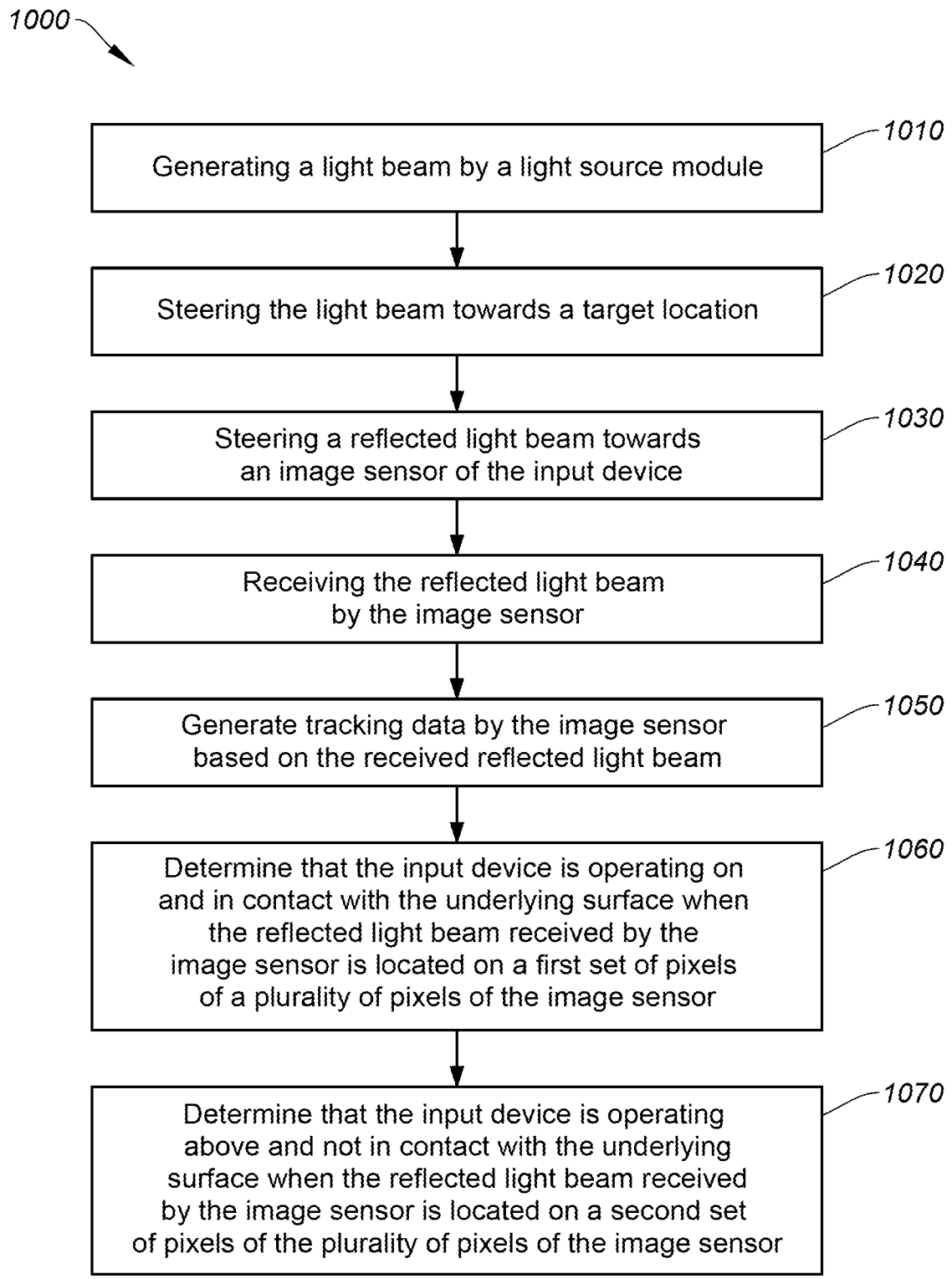
FIG. 10 shows a simplified block diagram of a method for performing lift detection for an input device, according to certain embodiments.

FIG. 10 shows a simplified block diagram of a method for performing lift detection for an input device, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by aspects of image sensor circuit 500, processor 210 or aspects of system 200, or a combination thereof.

At operation 1010, method 1000 can include generating a light beam by a light source module controlled by one or more processors of the input device, according to certain embodiments.

At operation 1020, method 1000 can include steering the light beam towards a target location, wherein the target location corresponds to a spot on an underlying surface while the input device is operating on the underlying surface, according to certain embodiments. An illumination lens may be used to steer the light beam towards the target location.

At operation 1030, method 1000 can include steering a reflected light beam that is reflected off of the underlying surface towards an image sensor of the input device, according to certain embodiments. In some aspects, an imaging lens can be sued to steer the reflected beam towards the image sensor.

At operation 1040, method 1000 can include receiving the reflected light beam by the image sensor, the image sensor controlled by the one or more processors, according to certain embodiments. In some aspects, the image sensor includes a pixel array having a plurality of pixels that receives the reflected light beam on the image sensor. The plurality of pixels can include a first set of pixels that form a square shape that receives the reflected light from the light source module when the input device is operating on the underlying surface. The plurality of pixels can include a second set of pixels that is adjacent to the first set of pixels such that the first set of pixels and the second set of pixels together form a rectangle. In some aspects, the second set of pixels is configured at a location relative to the first set of pixels such that the reflected light from the light source module moves from the first set of pixels to the second set of pixels as the input device is lifted off of the underlying surface.

At operation 1050, method 1000 can include generating tracking data by the image sensor that corresponds to a two-dimensional (2D) movement of the input device with respect to the underlying surface based on the received reflected light beam, according to certain embodiments.

At operation 1060, method 1000 can include determining that the input device is operating on and in contact with the underlying surface when the reflected light beam received by the image sensor is located on a first set of pixels of a plurality of pixels of the image sensor, according to certain embodiments.

At operation 1070, method 1000 can include determining that the input device is operating above and not in contact with the underlying surface when the reflected light beam received by the image sensor is located on a second set of pixels of the plurality of pixels of the image sensor, according to certain embodiments. As described above, the reflected light from the light source module can form a spot on the first set of pixels when the input device is operating on the underlying surface and method 1000 can further include detecting an edge of the spot, by the one or more processors, by identifying boundaries where a first pixel of a pair of adjacent pixels are at or above a threshold illumination value and a second pixel of a pair of adjacent pixels are below the threshold illumination value and determining a centroid of the spot, by the one or more processors, based on the detected edge of the spot. In some cases, method 1000 can further include determining, by the one or more processors, an amount that the input device has lifted off of the underlying surface based on the location of the determined centroid of the spot on the plurality of pixels.

In some embodiments, the input device can further comprise an inertial measurement unit (IMU) with an accelerometer, where method 1000 can further include determining whether the input device has been lifted vertically from the underlying surface or tilted off of the underlying surface based, in part, on inertial data received from the IMU and the location of the centroid of the spot on the plurality of pixels.

In certain embodiments, the reflected light substantially overfills the first set of pixels and not the second set of pixels while the input device is operating on the underlying surface, and the reflected light substantially overfills the second set of pixels or a portion thereof when the input device is lifted or tilted off of the underlying surface.

It should be appreciated that the specific steps illustrated in FIG. 10 provide a particular method 1000 for performing lift detection for an input device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An input device comprising:
   a housing;
   one or more processors;
   a light source module coupled to the housing and controlled by the one or more processors, the light source module configured to generate and direct light towards an underlying surface that the input device is operating on; and
   an image sensor module coupled to the housing and controlled by the one or more processors, the image sensor module including a single image sensor configured to:
      receive reflected light from the light source module that is reflected off of the underlying surface; and
      generate tracking data that corresponds to a two-dimensional (2D) movement of the input device with respect to an underlying surface based on the received reflected light from the light source module,
      wherein the single image sensor is comprised of a plurality of pixels in a rectangular arrangement with two regions including:
      a first, square, two-dimensional set of pixels of the plurality of pixels configured to receive the reflected light from the light source module when the input device is operating on the underlying surface; and
      a second two-dimensional set of pixels of the plurality of pixels adjacent to the first set of pixels that is configured to extend a horizontal movement detection range of the input device by receiving the reflected light from the light source module when the input device is lifted off of the underlying surface, the extended horizontal movement detection range enabling a generation of 2D tracking data that facilitates lift detection and 2D movement tracking while the input device is lifted off of the underlying surface,
      wherein the one or more processors are configured to detect lift-off of the input device from movement of a centroid of an image projected onto the image sensor;
      wherein the input device is configured to detect both 2D movement of the input device relative to the underlying surface and detect the input device being lifted off of the underlying surface using the same single image sensor.

2. The input device of claim 1 wherein the second set of pixels is configured at a location relative to the first set of pixels such that the reflected light from the light source module moves from the first set of pixels to the second set of pixels as the input device is lifted off of the underlying surface.

3. The input device of claim 1 wherein the one or more processors are configured to not read the pixels in the second two-dimensional set of pixels until detection that the input device has lifted off of the underlying surface.

4. The input device of claim 1 wherein reflected light from the light source module forms a spot on the first set of pixels when the input device is operating on the underlying surface, and wherein the one or more processors are configured to:
   detect an edge of the spot by identifying boundaries where a first pixel of a pair of adjacent pixels are at or above a threshold illumination value and a second pixel of a pair of adjacent pixels are below the threshold illumination value; and
   determine a centroid of the spot based on the detected edge of the spot.

5. The input device of claim 1 wherein the one or more processors are configured to not read the pixels in the second two-dimensional set of pixels in an office mode, and are configure to read the pixels in the second two-dimensional set of pixels in a gaming mode.

6. The input device of claim 5 further comprising an inertial measurement unit (IMU) with an accelerometer, wherein the one or more processors are further configured to determine whether the input device has been lifted vertically from the underlying surface or tilted off of the underlying surface based, in part, on inertial data received from the IMU and the location of the centroid of the image on the plurality of pixels.

7. The input device of claim 1 wherein the light source module includes an infra-red LED.

8. The input device of claim 1 further comprising:
a specular lens configuration including:
a first lens configured to direct light from the light source module towards the underlying surface; and
a second lens configured to direct the reflected light off of the underlying surface to the first set of pixels of the image sensor when the input device is operating on the underlying surface.

9. The input device of claim 8 wherein the reflected light substantially overfills the first set of pixels and not the second set of pixels while the input device is operating on the underlying surface.

10. The input device of claim 9 wherein the reflected light substantially fills at least a majority portion the second set of pixels when the input device is lifted or tilted off of the underlying surface.

11. A method of operating an input device, the method comprising:
generating a light beam by a light source module controlled by one or more processors of the input device;
steering the light beam towards a target location, wherein the target location corresponds to a spot on an underlying surface while the input device is operating on the underlying surface;
steering a reflected light beam that is reflected off of the underlying surface towards an image sensor of the input device;
receiving the reflected light beam by the image sensor, the image sensor controlled by the one or more processors;
generating tracking data by the image sensor that corresponds to a two-dimensional (2D) movement of the input device with respect to the underlying surface based on the received reflected light beam;
determining that the input device is operating on and in contact with the underlying surface when the reflected light beam received by the image sensor is located on a first two-dimensional set of pixels of a plurality of pixels of the image sensor;
determining that the input device is operating above and not in contact with the underlying surface when the reflected light beam received by the image sensor is located on a second two-dimensional set of pixels of the plurality of pixels of the image sensor,
wherein the second two-dimensional set of pixels includes at least a 2×2 arrangement of pixels;
tracking 2D movement of the input device while the input device is lifted off of the underlying surface when the reflected light beam received by the image sensor is located on the second two-dimensional set of pixels of the plurality of pixels of the image sensor;
detecting lift-off of the input device from movement of a centroid of an image projected onto the image sensor; and
detecting both 2D movement of the input device relative to the underlying surface and detecting the input device being lifted off of the underlying surface using the same single image sensor.

12. The method of claim 11 wherein the first set of pixels forms a square shape that receives the reflected light from the light source module when the input device is operating on the underlying surface,
wherein the second set of pixels is adjacent to the first set of pixels such that the first set of pixels and the second set of pixels together form a rectangle, and
wherein the second set of pixels is configured at a location relative to the first set of pixels such that the reflected light from the light source module moves from the first set of pixels to the second set of pixels as the input device is lifted off of the underlying surface.

13. The method of claim 12 wherein the input device further includes an illumination lens and an imaging lens, wherein the steering the light beam towards a target location is performed by the illumination lens, and wherein the steering a reflected light beam that is reflected off of the underlying surface towards an image sensor is performed by the imaging lens.

14. The method of claim 12 wherein the reflected light substantially overfills the first set of pixels and not the second set of pixels while the input device is operating on the underlying surface, and wherein the reflected light substantially overfills the second set of pixels when the input device is lifted or tilted off of the underlying surface.

15. The method of claim 11 wherein reflected light from the light source module forms a spot on the first set of pixels when the input device is operating on the underlying surface, and wherein the method further comprises:
detecting an edge of the spot, by the one or more processors, by identifying boundaries where a first pixel of a pair of adjacent pixels are at or above a threshold illumination value and a second pixel of a pair of adjacent pixels are below the threshold illumination value; and
determining a centroid of the spot, by the one or more processors, based on the detected edge of the spot.

16. The method of claim 15 further comprising:
determining, by the one or more processors, an amount that the input device has lifted off of the underlying surface based on the location of the determined centroid of the spot on the plurality of pixels.

17. The method of claim 15 wherein the input device further comprises an inertial measurement unit (IMU) with an accelerometer, wherein the method further includes:
determining whether the input device has been lifted vertically from the underlying surface or tilted off of the underlying surface based, in part, on inertial data received from the IMU and the location of the centroid of the spot on the plurality of pixels.

18. A system for operating an input device, the system comprising:
one or more processors;
one or more machine-readable, non-transitory storage mediums that include instructions configured to cause the one or more processors to perform operations including:
generating a light beam by a light source module with an IR LED controlled by one or more processors of the input device;

steering the light beam towards a target location, wherein the target location corresponds to a spot on an underlying surface while the input device is operating on the underlying surface;

steering a reflected light beam that is reflected off of the underlying surface towards an image sensor of the input device;

receiving the reflected light beam by the image sensor, the image sensor controlled by the one or more processors;

generate tracking data by the image sensor that corresponds to a two-dimensional (2D) movement of the input device with respect to the underlying surface based on the received reflected light beam;

determine that the input device is operating on and in contact with the underlying surface when the reflected light beam received by the image sensor is located on a first two-dimensional set of pixels of a plurality of pixels of the image sensor;

determine that the input device is operating above and not in contact with the underlying surface when the reflected light beam received by the image sensor is located on a second two-dimensional set of pixels of the plurality of pixels of the image sensor, wherein the second two-dimensional set of pixels includes at least a 2×2 arrangement of pixels; and tracking 2D movement of the input device while the input device is lifted off of the underlying surface when the reflected light beam received by the image sensor is located on the second two-dimensional set of pixels of the plurality of pixels of the image sensor;

wherein the first set of pixels forms a square shape that receives the reflected light from the light source module when the input device is operating on the underlying surface;

wherein the second set of pixels is adjacent to the first set of pixels such that the first set of pixels and the second set of pixels together form a rectangle;

wherein the second set of pixels is configured at a location relative to the first set of pixels such that the reflected light from the light source module moves from the first set of pixels to the second set of pixels as the input device is lifted off of the underlying surface;

wherein the one or more processors are configured to detect lift-off of the input device from movement of a centroid of an image projected onto the image sensor;

wherein the input device is configured to detect both 2D movement of the input device relative to the underlying surface and detect the input device being lifted off of the underlying surface using the same single image sensor;

wherein the one or more processors are configured to not read the pixels in the second two-dimensional set of pixels in an office mode, and are configure to read the pixels in the second two-dimensional set of pixels in a gaming mode; and wherein the steering of the light beam and a reflected light beam are performed by a specular lens configuration including:
- a first lens configured to direct light from the light source module towards the underlying surface; and
- a second lens configured to direct the reflected light off of the underlying surface to the first set of pixels of the image sensor when the input device is operating on the underlying surface.

19. The system of claim 18 wherein the one or more processors are configured to not read the pixels in the second two-dimensional set of pixels until detection that the input device has lifted off of the underlying surface.

20. The system of claim 18 wherein the instructions are further configured to cause the one or more processors to perform operations including:

determining a surface type of the underlying surface;

in response to determining that the surface type is a high contrast surface, utilizing both the first and second set of pixels for tracking the location of the reflected light beam; and in response to determining that the surface type is a low contrast surface, utilizing only the first set of pixels for tracking the location of the reflected light beam.

* * * * *